Figure 1:
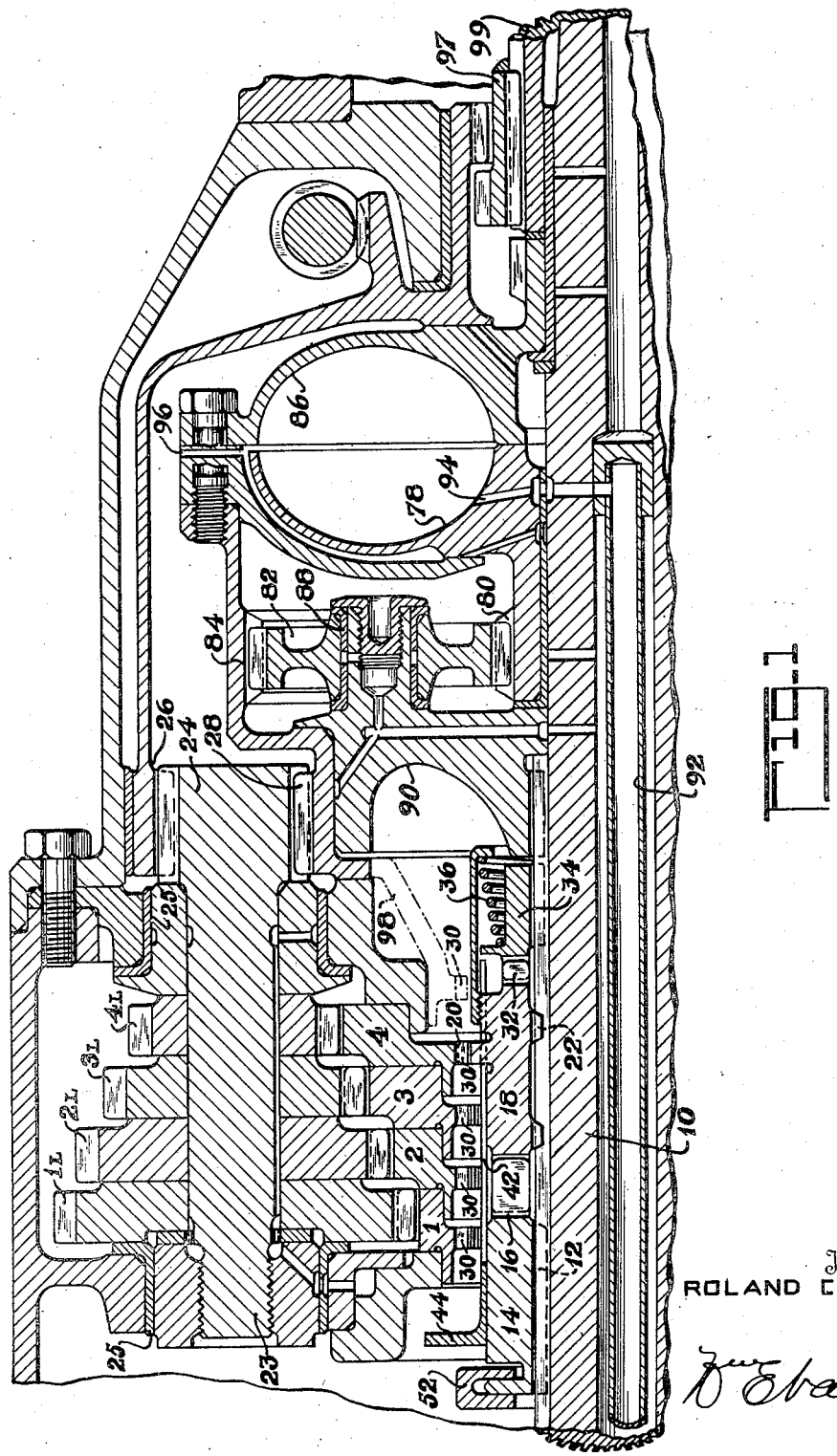

May 21, 1946. R. CHILTON 2,400,540
TRANSMISSION
Original Filed June 23, 1943 6 Sheets-Sheet 1

Inventor
ROLAND CHILTON.
Attorney

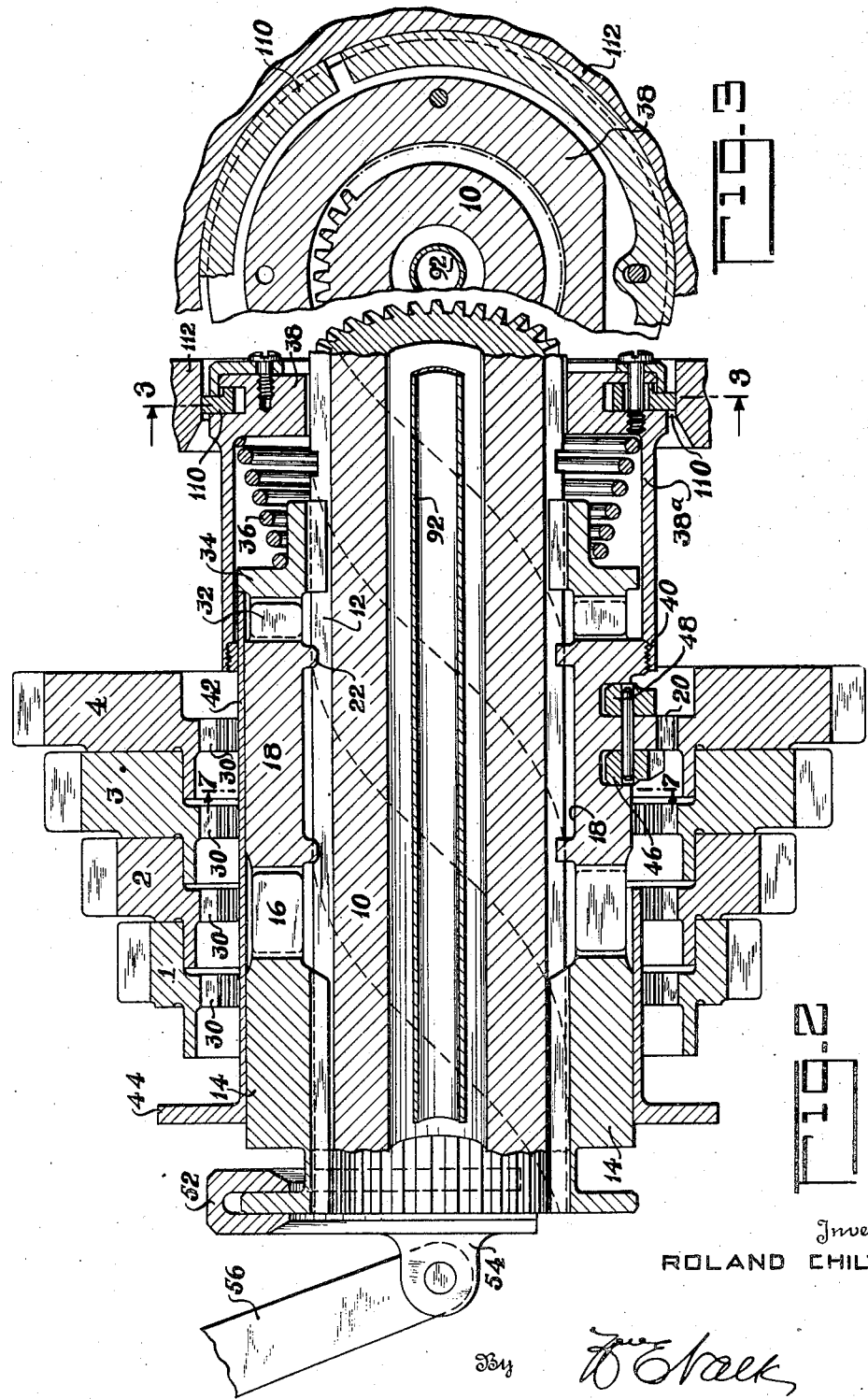

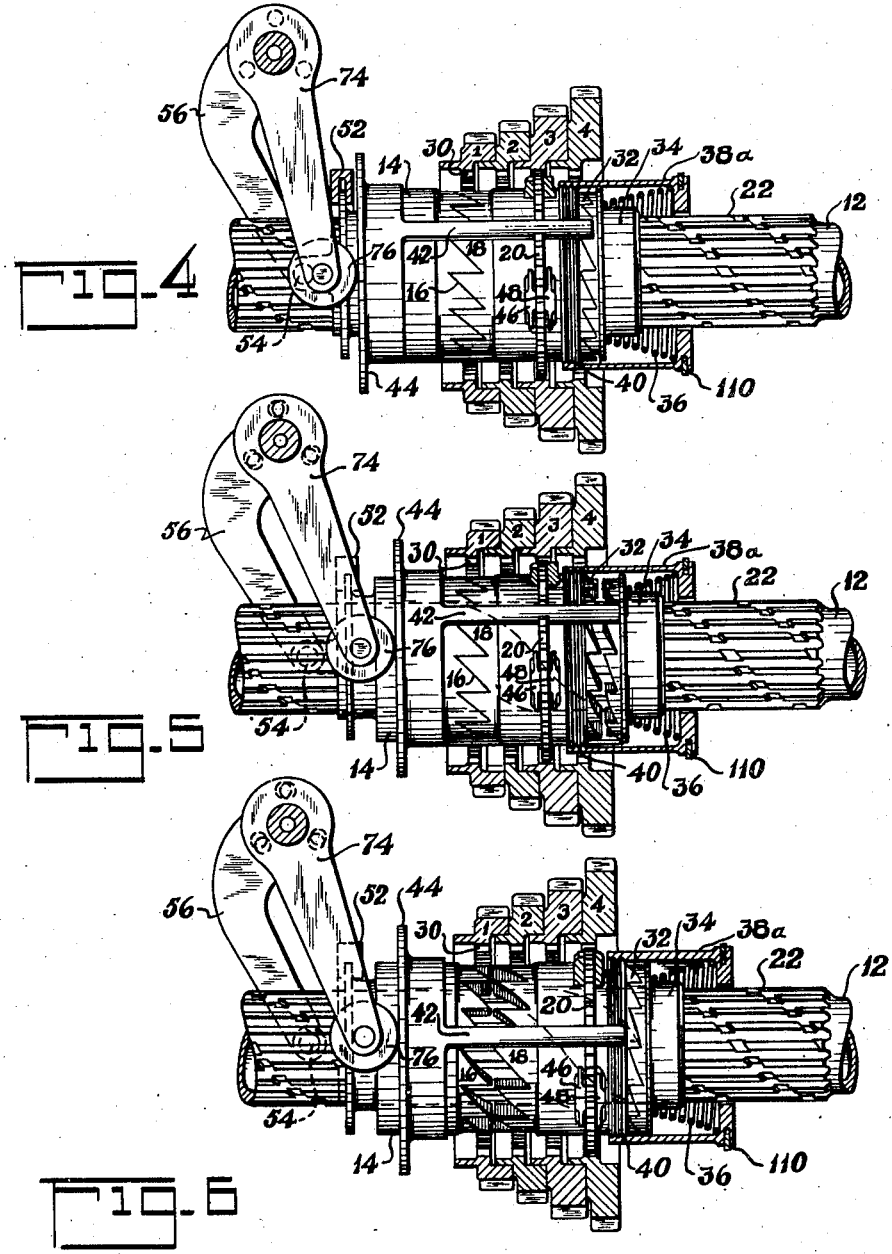

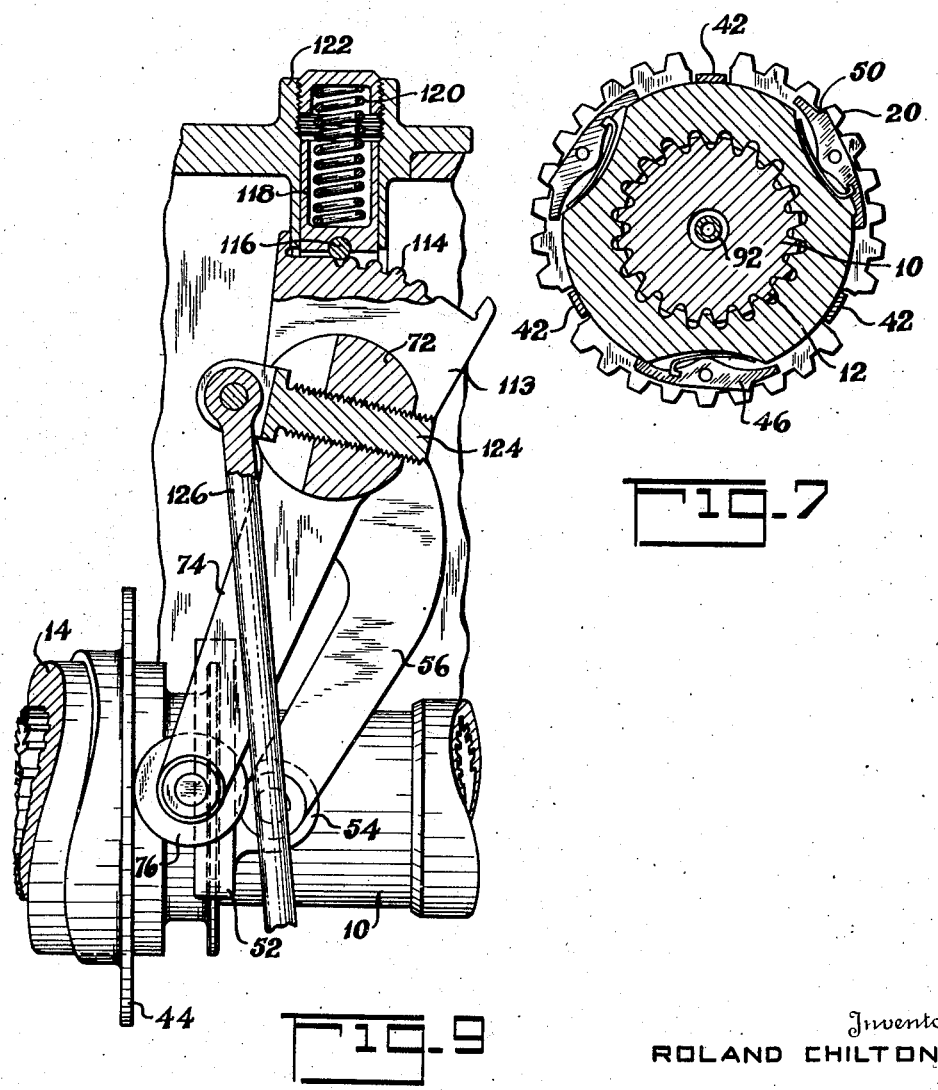

May 21, 1946. R. CHILTON 2,400,540
TRANSMISSION
Original Filed June 23, 1943 6 Sheets-Sheet 5
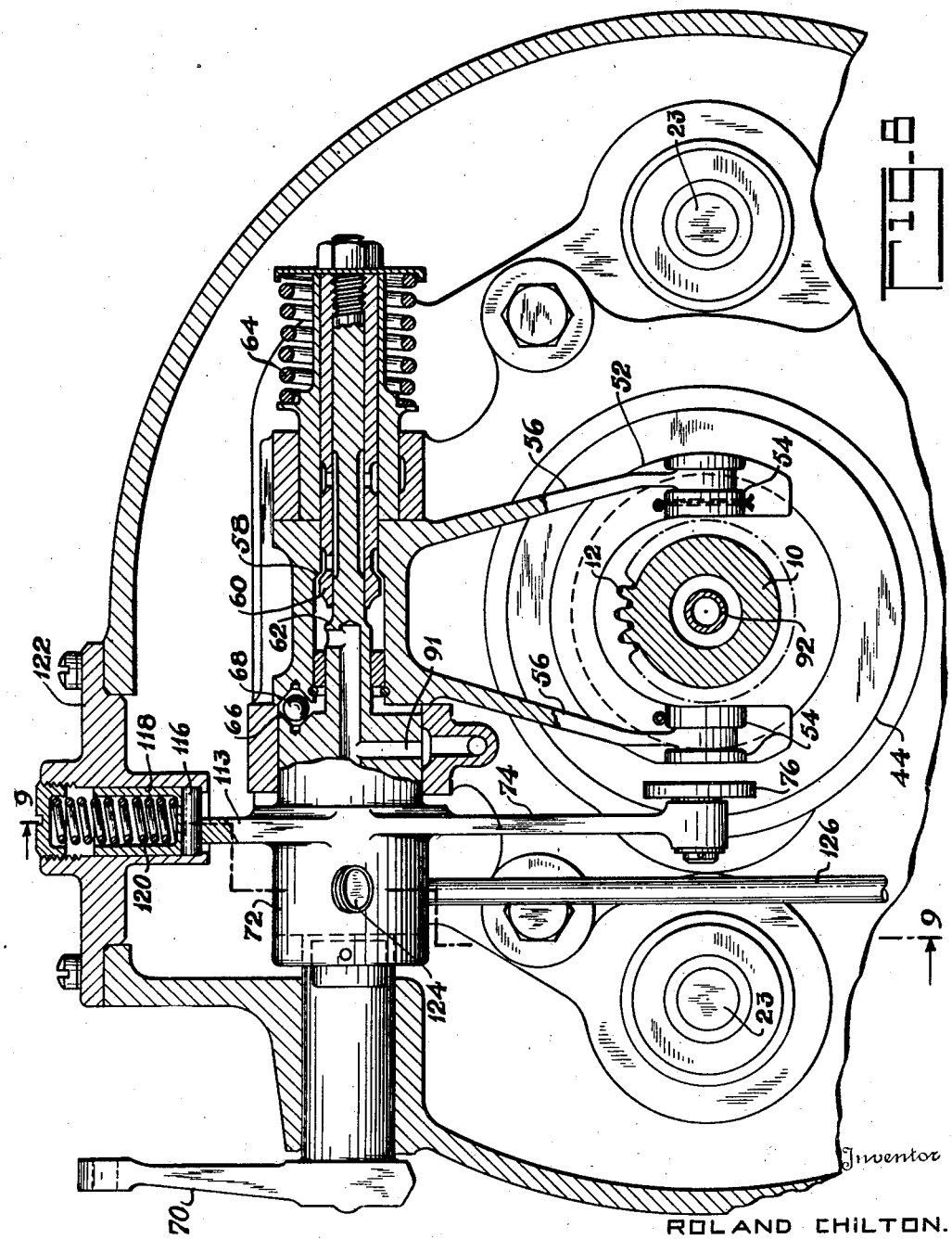
ROLAND CHILTON.

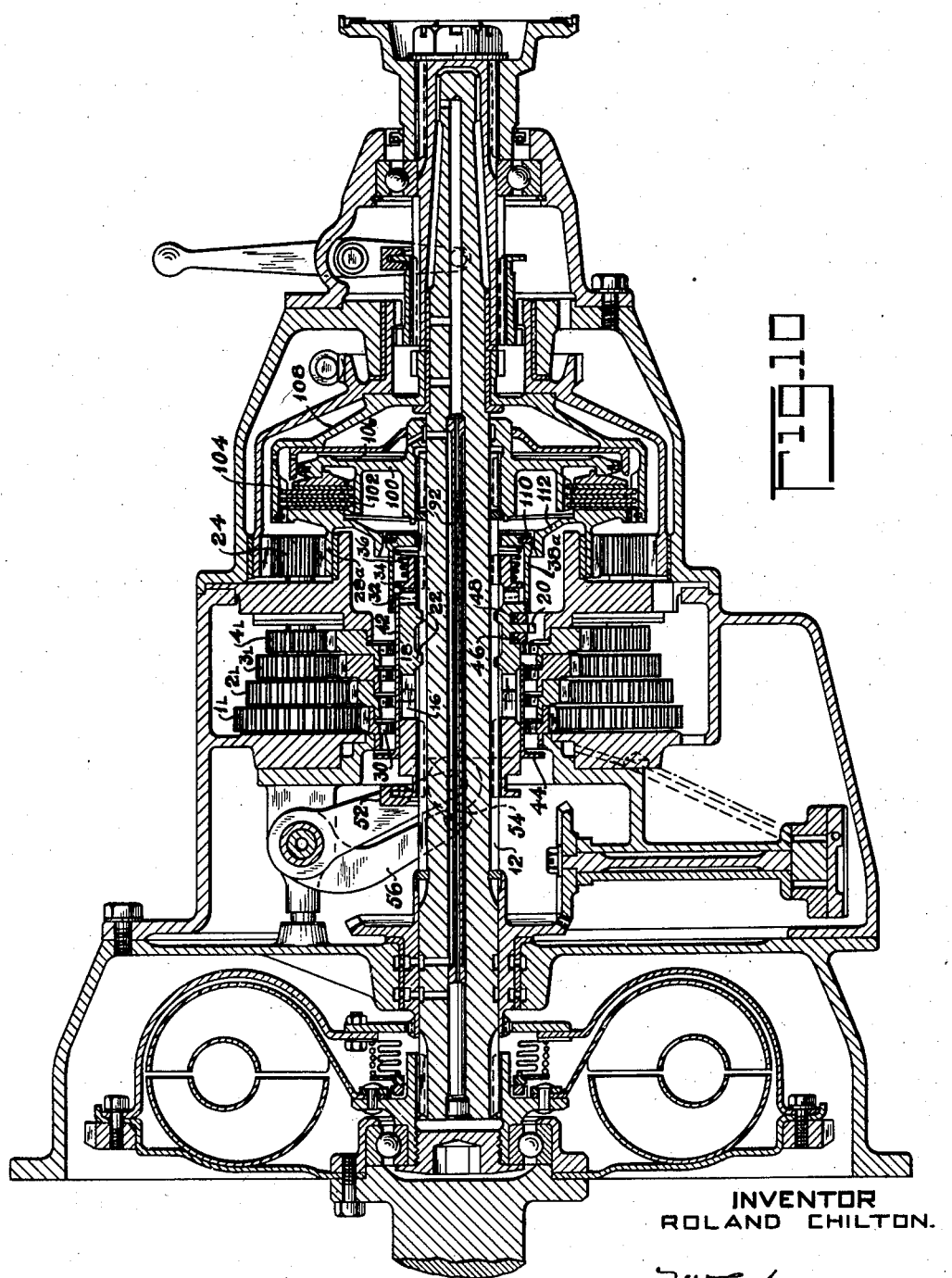

Patented May 21, 1946

2,400,540

UNITED STATES PATENT OFFICE 2,400,540

TRANSMISSION

Roland Chilton, Ridgewood, N. J., assignor to Wright Aeronautical Corporation, a corporation of New York Original application June 23, 1943, Serial No. 492,166. Divided and this application September 21, 1944, Serial No. 555,163

16 Claims. (Cl. 74—371)

This invention is a division of my co-pending application Serial No. 492,166, filed June 23, 1943, and comprises novel and improved means for shifting driving torque from one to another of several gears affording different speed ratios. The general objectives are similar to those in my copending application Serial No. 462,059, filed October 14, 1942. That application discloses a slip-coupling between driving and driven shafts automatically loadable to relieve the gears of torque for shifting which is accomplished by a novel screw shift selector member which shifts successively through a plurality of gears by screw shift co-action with a shaft also having parallel splines mounting a locking member which takes the driving load from the selector and defines the various gear stations therefor. This co-pending disclosure shows a supercharger drive, which is not subject to reversed or over-running torque under which the co-pending structure would automatically shift from any lower gear into high gear. A transmission suitable for general automotive use is illustrated in the instant application wherein such automatic shift into high may be undesirable and, accordingly, a feature of the present invention consists in novel structure permitting reversed torque to be transmitted without screw-shift action whereby, for instance, the engine may be used as a brake.

Other objects and advantages of the invention will be obvious from, or will be pointed out in, the following description with reference to the drawings in which:

Fig. 1 is a longitudinal section through part of a transmission,

Fig. 2 is a longitudinal section to a much larger scale showing the main shift elements, Fig. 3 is a detail cross section on the line 3—3 of Fig. 2, Figs. 4, 5, and 6 are part sections illustrating the shifting mechanism in various phases of shift, Fig. 7 is a section on line 7—7 of Fig. 2 illustrating the ratchet pawls, Fig. 8 is a fragmentary end view in partial section on the axis of a control shaft, Fig. 9 is a detailed side view in part section on the line 5—5 of Fig. 8, and Fig. 10 is a longitudinal section through a modification.

Referring first to Fig. 1, 10 designates a power shaft (here regarded as the input or driving shaft of the transmission) furnished with axial splines 12 on which is mounted a locking member 14 provided with end jaws 16 having axial driving faces and helical backs as seen in Figs. 4 to 6. These jaws are engageable by similar jaws formed on a screw shift or selector member 18 having external selector clutch teeth 20 (see also Fig. 2). This screw member is mounted on helical splines 22 having the same lead as the helical backs of jaws 16. The splines 22 are cut over the top of the straight splines 12 as seen in Figs. 4 to 6.

Surrounding the shift mechanism are a plurality of concentric gears 1, 2, 3, 4, meshed with layshaft gears 1L, 2L, 3L and 4L rigid with a plurality of layshafts 23 supported on suitable bearings 25 and providing first, second, third, and fourth, etc. speeds. The layshafts have pinions 24 meshed with final drive gears 26 and 28 which rotate in opposite directions, the gear 28 providing the forward drive speeds. Each of the gears 1, 2, 3, 4, etc., is provided with similar clutch teeth 30 engageable with the clutch teeth 20 of the screw shift selector member 18. The spacing of the gear clutch teeth 30 defines the shift increment of the member 18 and the helical lead of the shifting spline 22 is made equal to this shift increment multiplied by the number of jaws 16, whereby rotation of the shift member one jaw, relative to the locking member 14 and re-meshing the jaws moves and locates the shift member 18 one shift increment from its previous position. No drive is transmitted through the helical splines 22, forward drive being exclusive through the axial faces of jaws 16 of the screw member 18, the locking member 14 and the axial splines 12 therein.

It will be seen that with the foregoing structure reverse driving torque or over-run of the shaft 10 by the shift member 18 would not be transmitted on account of the helical relation between the jaws 16 and the splines 12 but such over-run rotation of the shaft 10 by the screw shift member 18 would shift this member to the right as illustrated in the drawings. However, according to this invention such over-run is prevented by additional end jaws 32 formed on the right hand end of the screw shift member 18 and engaging similar jaws of an auxiliary locking member 34 also slidable on the axial splines 12 of the main shaft 10. These anti-over-run jaws 32, it should be noted, face the opposite way to the driving jaws 16 and it is clear that when both sets of jaws are engaged, the shift member 18 is locked against rotation in either direction relative to the main shaft 10.

The auxiliary or anti-over-run locking member 34 is normally held engaged with the jaws 32 by a spring 36 abutting a housing 38 rigidly secured at 40 to a flange formed on the right hand end of the shift member 18 as shown. This flange and the selector teeth 20 have local interruptions (Fig. 7) through which pass longitudinal release fingers 42 projecting from a release collar 44 slidable upon the members 14 and 18 so that the fingers 42 may abut and disengage the auxiliary locking member 34 when the release collar 44 is moved to the right against the pressure of the spring 36, as later to be described. The auxiliary jaws 32 are shown engaged in Figs. 1, 2, 4 and 6 and released in Fig. 5. Also in Figs. 4, 5 and 6 the housing 38 is modified to correspond to the housing illustrated in Fig. 10 and accordingly has been designated by the reference character 38a.

The screw shift or selector member 18 on each side of the teeth 20 is provided with ratchet pawls 46 and 48 seen in end view in Fig. 7 (where the releasing fingers 42 are also seen). The pawls 46 have tooth engaging toes or shoulders 50 aligned with the flanks or driving faces of appropriate selector clutch teeth 20 as shown. The pawls 46 and 48 face in opposite directions and whenever the selector teeth 20 are disengaged so as to be between adjacent gear teeth 30 (in "neutral"), the individual pawls have ratchet co-action with the respective gear teeth.

Assuming the transmission to be stationary (for the moment disregarding the locking jaws 16 and 32), and the main shaft 10 to be rotated backwards and forwards through one locking jaw angle, it will be seen that even though the shift member 18 is in its neutral position, the pawls engaging the adjacent stationary gears will hold the screw shift member 18 from rotation, thus screwing it along the shaft into the respective adjacent gears as the shaft is rocked backwards and forwards.

In actual operation, the selector teeth 20 and the adjacent gear teeth 30 are all rotating but the selector teeth can only be in neutral position when running at speeds intermediate the adjacent gears i. e., when one of these gears is running faster and the other slower than the selector, or in other words, when one gear is over-running and the other under-running the selector, under which conditions the opposite facing ratchet pawls 46 and 48 are passing over the respective gear clutch teeth 30 and the shift is then automatically responsive to relative acceleration or deceleration until synchronization with one gear is reached, whereupon the appropriate ratchet positively engages the synchronized gear which will screw the selector member 18 along the shaft and into engagement with that gear, within a few degrees of relative rotation past synchronization. It is important to remember that control movement of the main locking member 14 (later to be described) does not in itself produce any movement of the selector or screw shift member 18. Because of its helical jaws the locking member 14 does not prevent an upshift of the selector member 18 and in the case of a downshift, shift movement of the locking member merely frees the selector member for automatic screw shift action along the shaft under the control of the ratchet pawls which produce engagement with the next synchronized gear.

As previously stated, the helical lead of the jaws 16 is the same as that of the shifting spline 22 wherefore the screw shift selector may rotate and move axially to the right to disengage the jaws 16 without any axial motion of the locking member 16 until the point-to-point position of the jaws 16 is reached (as shown in Fig. 6) whereupon the parts are in position for the locking member 14 to snap to the right to fully reengage the locking jaws 16, but with the selector member 18 one shift increment from the previously engaged position of the jaws. In other words, the screw shift selector may move toward a next higher gear ratio (to the right in the drawings) without any movement of the main locking member 14 (but only after the auxiliary or anti-over-run locking jaws 32 have been released). These auxiliary jaws 32 may have a smaller helical lead than the helical splines 16 whereby the helical shift selector may move toward a lower gear (leftwardly in the showings) without previously releasing the auxiliary locking jaws 32.

Control of the main locking jaw 14 is through a shift collar 52 having ears 54 (Fig. 2) connected to a pair of arms 56 comprising a bifurcated control lever (as seen in end view, Fig. 8). This control lever has a hollow hub including a valve seat 58 cooperating with a valve 60 on a shaft 62 which valve is normally held on its seat by pressure from a spring 64. At the left hand side of the control lever 56 the control shaft 62 has a shoulder 72 having a circumferential plurality of conical pockets 66 and similar opposed pockets are formed in the control lever hub as shown. Engaged in these opposed pockets are balls 68 and these comprise a yielding torsional connection between the control shaft 62, 72 and the lever 56 whereby the control lever may lag behind rotative movement of the shaft 62, under which relative motion, the co-action of the balls 68 with the conical pockets 66 is operative to open the valve 60 by moving the shaft 62 to the left against the pressure of the spring 64. This pressure, acting through the inclined pockets 66 and balls 68, then exerts an elastic shifting force on the control lever 56 urging the locking collar 14 to shift movement. Shifting motion of the control shaft 62 may be through a hand lever 70 engaged with the enlarged left hand end 72 of the shaft.

In operation, whenever the control lever 70 is shifted one increment, the locking collar 14 will be unable immediately to respond because of the driving torque being transmitted by the jaws 16, whereby the oil control valve 58 is always opened when a shift is initiated and remains open until the locking member 14 is able to respond to the control movement which response occurs at different phases of the ensuing shift of the screw member 18, according as an up or down shift is initiated. In the case of a down shift (leftward motion of the locking member 14) the jaws 16 cannot disengage until the parts are unloaded or brought to zero torque, whereupon the locking ring is snapped one increment to the left, as shown in Fig. 6, by corresponding swing of the control lever 56 which promptly closes control valve 60 from the pressure of the spring 64 which re-centralizes the balls 68 in their pockets as previously described. When the manual control lever 70 moves the shaft 62 for an up shift (right hand movement of the selector member 18 as seen in the drawings) the locking collar 14 does not follow the ensuing right hand shifting motion of the selector 18 until this has rotated one jaw space (Fig. 6) whereupon the control spring 64 acting through the balls 68 and their conical pockets snaps the locking collar 14 to the right with the jaws 16 re-meshed one jaw spacing removed from previous position, this action closing the oil control valve 60 on the completion of an up shift. In short, the control valve 60 is automatically opened immediately upon either upward or downward shift of the control lever 70, but is closed when the driving parts are relieved of driving torque in the case of a down shift, but the control valve is not closed until the shift is complete in the case of an up shift; i. e., the control valve closure anticipates down shift movement of the screw shift selector 18, but follows on completion of the screw shift in the case of an up shift.

A downwardly depending release lever 74 is made rigid with the left hand end 72 of the shaft 62 as shown, and has a roller 76 engageable with the release collar 44 in the case of an up shift. As before stated, the movement of the control lever 70 and shaft 62, 72, and therefore of the release lever 74, precedes the responsive movement of the locking member 14 and its lever 56 so that before any up shift of the screw shift selector 18 occurs, the release collar 44 and its release fingers 42 disengage the auxiliary or anti-over-run jaws 32 by rightward movement of this locking member against the pressure of the spring 36, as shown in Fig. 5.

The driving parts are relieved of torque and synchronized for shifting by a slip coupling capable of transmitting torque between the driving and driven shafts independently of the 1, 2, 3, 4, etc. gears when such coupling is loaded with oil, which loading is automatically controlled by the automatic control valve 60, operable as previously described. In one form (Fig. 1) a fluid coupling is used comprising a driving member 78 having a sun gear 80 free to rotate on the main shaft 10 at relatively high speed. For this purpose, the sun gear 80 is engaged by planets 82 which also engage an annular gear 84 rigid with the forward drive gear 28 and with a driven coupling member 86. The planet pinions 82 are mounted on journals 88 rigid with a planet carrier 90 splined to the main shaft 10. By this organization the speed of the driving fluid coupling member 78 is in excess of that of the driven element 84, 86 and as a result when the fluid coupling is loaded only a small part of the torque is transmitted through the sun gear 80 and the coupling, most of the torque being transmitted directly through the annular gear 84 which is rigid with the other driven elements. This feature is more fully described in applicant's co-pending application, Serial No. 480,117, filed March 22, 1943. The coupling oil control valve 60 is provided with a primary source of oil through duct 91 and its delivery side is connected by suitable ducts to a tube 92 within the main shaft 10, whence the fluid coupling is filled through radial holes 94. The coupling is further provided with circumferential vent holes 96 through which it proceeds to drain whenever the control valve 60 shuts. Also, the driven coupling member 86 and the reverse drive gear 26 are each provided with splines engageable by a shiftable spline member 97 to provide a forward or reverse drive for the driven shaft 99.

Recapitulating the mode of operation:

Whenever the control lever 70 is thrown to a new gear station the control valve 60 is immediately opened both for an up and down shift, as previously described, and the coupling 78, 86 proceeds to fill thereby transmitting an increasing proportion of the torque to the driven member 86 and progressively relieving the screw shift member 18 and the associated gears of torque, until the coupling is sufficiently filled to tranmit all the torque, i. e., to relieve the screw shifting member 18 of all driving load. Immediately this occurs (in the case of a down shift) the locking member 14 is snapped to the left by the reaction from the spring 64 on the lever 56 as previously described, thereby closing the control valve so that the coupling proceeds to drain through the vent holes 96. This movement of the locking member 14 separates the driving jaws 16 so that as the coupling drains the engine is gradually relieved of its load, whereupon the engine accelerates the drive shaft 10. As a result the shaft 10 promptly screws the selector member 18 out of engagement into neutral position and, when the acceleration of the shaft 10 brings it to synchronism with the next lower gear, the appropriate ratchet pawls screw-shift the selector into engagement with such next lower gear, which engagement also restores the locking teeth 16 to their fully meshed position ready to resume the drive as the coupling 78, 86 empties. When the coupling has completely drained, all of the drive is again through the screw shift member 18 and locking member 14, and the coupling is running in its normally unloaded condition. In the case of an up shift, the control valve 60 is also opened and the coupling also starts to fill, immediately the control lever 70 is shifted, but in this case (up shift) the filling continues past the zero-torque point and until the next higher gear is synchronized, during which time the locking jaws 16 are gradually disengaging without any responsive motion of the locking collar 14 until the coupling fills sufficiently to synchronize the next higher gear. Upon synchronization the ratchets 48 immediately draw the screw shift member 18 into engagement with said higher gear thereby bringing the locking jaws 16 to the point-to-point position shown in Fig. 6, whereat the reaction from the spring 64 on the lever 56 promptly snaps the locking member 14 to the right fully engaging the jaws 16. At the same time, the coupling oil supply is cut off and thereupon the coupling again proceeds to drain through the vent 96 and the driving torque again devolves upon the jaws 16. As previously stated, in the case of an up shift the lever 74, the release collar 44, and the fingers 42 disengage the anti-over-run jaws 32 immediately the control lever 70 is first shifted.

In brief, throwing the control for an up or for down shift instantly starts the loading of the coupling and in the case of a down shift the unloading of the coupling starts when the coupling has filled sufficiently to take the driving load off the jaws 16, whereby the screw shift action proceeds while the coupling is draining; i. e., while the driving means is (relatively) accelerating. On the other hand, in the case of an up shift, the coupling continues to fill after it has relieved the parts of driving torque and until the shift is complete, whereby the "up" automatic screw shift occurs while the coupling is filling; i. e., while the driving means is (relatively) decelerating. It will be seen that the screw shift action is dependent on relative acceleration and deceleration between the drive shaft 10 and the gear or gears engaged by the screw shift selector teeth 20 and/or its associated ratchets. The foregoing description is worded for acceleration or deceleration of the driving shaft with the driven system, i. e., the gears 1, 2, 3, 4, and the output member 28—84—86 rotating at constant speed. However, deceleration and acceleration of the driven system with input shaft 10 running at constant speed will equally produce the relative speed changes which effect the automatic screw shift, and, in fact, simultaneous acceleration of one system and deceleration of the other to synchronization of any new gear ratio will produce automatic screw shift engagement thereof, which is responsive always to the relative speed change between the input and output systems and has no connection with their combined mean speed. In fact, as previously described, the shift action could be obtained with either system stationary by slight backward and forward rotation of the other system. These relative accelerations and decelerations are obtained by the automatic loading of the slip coupling which was described above as a geared-up fluid type coupling.

As an alternative form of slip coupling, a friction clutch may be used, as illustrated in the complete small scale longitudinal section of Fig. 10 in which case a piston and hub member 100 is splined to the main shaft in place of the planetary member 90 and splined on this member are inner clutch plates 102 interspaced with driven clutch plates 104 operated by hydraulic pressure which is delivered to a cylinder 106 so as to act on the piston 100 and load the clutch plates to drive a forwardly rotating final drive member 108 which also carries rigidly a gear 28a meshed with the layshaft pinions 24, as already described in connection with the similar gear 28 of the previous embodiment. The supply of oil to such a friction clutch is controlled just as described in the previous embodiment and the mode of operation is the same except that torque is transmitted by solid sliding friction at the clutch plates 102 and 104 instead of the hydro-dynamic action of the fluid coupling, the planetary step-up gears having been eliminated. In addition, the friction clutch is able to lock the driving and driven shafts for unitary rotation without any slip, thereby giving a direct drive "high" gear, in which condition the selector member 18 is moved by the ratchet action out of engagement with the clutch teeth 30 of the next-to-high gear 4L. For effecting a down shift from this direct drive and re-engagement with gear 4L, a friction device (better seen in Fig. 2) is added to the spring housing 38a. This comprises a friction ring 110 adapted to expand against and frictionally engage a bore formed in an extension 112 of the driven member when the clutch 102, 104 provides said direct drive. Thus, when the clutch 102, 104 is disengaged from its direct drive condition and the driven member accordingly starts to lag behind the main shaft 10, it attempts to carry with it the screw shift member assembly 18, 38a and the appropriate ratchet thereby engages the next lower gear.

In the direct drive provided by the friction clutch 102, 104, the ratchets 46 of the selector member 18 will operate to shift the selector member until the ratchets 46 just clear the gear 4L and the ratchets 48 of this selector member are ineffective to provide any further shift since there is no gear above gear 4L for engagement by these ratchets 48. That is, in direct drive the selector member does not shift sufficiently to effect complete separation of the jaws 16, and therefore there is no follow-up movement of the locking collar 14, whereby the control valve 60 remains open to maintain the direct drive through the friction clutch 102, 104. It is possible that the selector member might be ejected from engagement with the gear 4L with considerable inertia and, therefore, shift sufficiently to completely separate the jaws 16, whereupon the resulting follow-up movement of the locking collar 14 would be effective to close the oil control valve 60. To prevent this possibility, suitable stop means may be provided to limit the up shift movement of the selector member 18 or locking collar 14 beyond the gear 4L. For example, a stop means may be provided on the extension 112 for engagement by the extension housing 38a carried by the selector member 18.

If a direct drive in high is desired, in connection with the first described embodiment, then (referring to Fig. 1) an extension 98 shown in dotted lines is formed on the driven member 28, comprising an additional set of teeth 30 engageable by the screw shift selector teeth 20 by further right hand movement thereof exactly as described for the other ratios. This additional direct drive would require provision for one further increment of right hand shift than has been allowed for in the axial clearances illustrated in Fig. 1.

The shift increments of the control levers 70, 74, and 56 are defined by a quadrant 113 (see Fig. 9) having notches 114 engaged by a latching roller 116 in a plunger 118 equipped with a latching spring 120 carried in a housing 122. The spacings of the notches 114 correspond to the gear shift increments and their profile relationship with the roller 116 is such that, when control force is applied to the lever 70 (preferably through a yielding connection not shown), the quadrant 113 and associated control elements are moved smartly from one notch to the next.

The shift increments of the control levers 70, 74 and 56 are defined by a quadrant 113 (see Fig. 9) having notches 114 engaged by a latching roller 116 in a plunger 118 equipped with a latching spring 120 carried in a housing 122. The spacings of the notches 114 correspond to the gear shift increments and their profile relationship with the roller 116 is such that, when control force is applied to the lever 70 the quadrant 113 and associated control elements are moved smartly from one notch to the next.

The foregoing description contemplates manual shift control but any known automatic means may be used instead of, or in addition, thereto. For instance, a lever member 124 may be adjustably screwed into the large end 72 and the control shaft and a rod 126 may engage this lever as seen in Fig. 9. The lower end of the rod 74 may then engage suitable speed and torque responsive automatic shift means such as described in my co-pending application Serial No. 492,165, filed June 23, 1943.

Unless otherwise specified, the "speed ratio" of the transmission as used in the following claims refers to the ratio of speed of the transmission output shaft to the speed of its input shaft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a multi-speed transmission, a driving shaft, a driven shaft, one of said shafts having a set of helical splines and another set of splines inclined relatively thereto, a series of axially spaced gears having clutch teeth, toothed clutch means slidable along said helical splines for selective engagement with the clutch teeth of said gears to provide a plurality of speed ratio driving connections between said shafts, means slidable along the other set of splines for locking said clutch means against shift movement in one direction along said helical splines at spaced stations along said one shaft corresponding to the spacing of said gears, said one shaft clutch means and locking means each having surfaces engageable with the other two of such form that the number of said stations may be increased merely by providing for an increased range of movement of said clutch and locking means in engagement with their respective splines, means controllable to effect shift movement of said clutch means along its helical splines, and releasable means adapted to lock said clutch means against shift movement in the other direction along its helical splines.

2. In a multi-speed transmission, a driving shaft, a driven shaft, one of said shafts having a set of helical splines and another set of splines inclined relatively thereto, a series of axially spaced gears having clutch teeth, toothed clutch means slidable along said helical splines for selective engagement with the clutch teeth of said gears to provide a plurality of speed ratio driving connections between said shafts, means slidable along the other set of splines for locking said clutch means against shift movement in one direction along said helical splines at spaced stations along said one shaft corresponding to the spacing of said gears, and for locking said clutch means against shift movement in the other direction along said helical splines at said spaced stations, said one shaft, clutch means and locking means each having surfaces engageable with the other two of such form that the number of said stations may be increased merely by providing for an increased range of movement of said clutch and locking means in engagement with their respective splines, and means controllable to effect shift movement of said clutch means along its helical splines.

3. In a multi-speed transmission, a driving shaft, a driven shaft, a series of axially spaced gears having clutch teeth, toothed clutch means slidable along one of said shafts for selective engagement with the clutch teeth of said gears to provide a plurality of speed ratio driving connections between said shafts, means to automatically effect a shift of said clutch means out of an engaged gear upon relief of the gear drive torque and to automatically effect a shift of said clutch means into engagement with another of said gears upon speed synchronism therewith, locking means movable along said one shaft and adapted to prevent shift movement of said clutch means in one direction along said one shaft at spaced stations corresponding to the spacing of said gears, said one shaft, clutch means and locking means each having surfaces engageable with the other two of such form that the number of said stations may be increased merely by providing for an increased range of movement of said clutch and locking means along said one shaft, means controllable to effect said torque relief and speed synchronism, and releasable locking means adapted to prevent shift movement of said clutch means in the other direction along said one shaft.

4. In a multi-speed transmission having a driving shaft and a driven shaft adapted to be operatively associated at a plurality of different speed ratios, a speed ratio shift mechanism comprising a speed-ratio shift member, a locking member, each of said members having different relative angular co-action with one of said shafts, said members also being adapted for mutual co-action so that either member must be shifted through a predetermined increment of movement relative to said shaft before the other can follow-up said shift with a corresponding increment of movement relative to said shaft, releasable locking means operable to prevent movement of said shift member away from said locking member, and means controllable to effect a speed ratio shift.

5. In a multi-speed transmission, driving and driven shafts, a series of axially spaced gears having similar clutch teeth and providing a plurality of gear drive ratios between said shafts, a clutch member slidable along one of said shafts for selective engagement with the clutch teeth of said gears, means to automatically effect a shift of said clutch member out of an engaged gear upon relief of the gear drive torque and to automatically effect a shift of said clutch member into engagement with another of said gears upon speed synchronism therewith, locking means adapted to prevent shift movement of said clutch member in a down-shift direction along said one shaft at spaced stations corresponding to the spacing of said gears, means controllable to release said locking means and to effect said torque relief and synchronization, said controllable means including means automatically responsive to the resulting gear shift for restoring the gear drive torque, and releasable means adapted to lock said clutch member against movement in an up-shift direction.

6. In a multi-speed transmission, a driving shaft, a driven shaft, a series of axially spaced gears having similar clutch teeth and providing a plurality of gear drive ratios between said shafts, one of said shafts having a set of helical splines, a toothed clutch member slidable in either direction along said splines for selective engagement with said gears, means to automatically effect a shift of said clutch member out of an engaged gear upon relief of the gear drive torque and to automatically effect a shift of said clutch member into engagement with another of said gears upon speed synchronism therewith, a pair of locking members, each of said locking members respectively being adapted to prevent shift movement of the clutch member in one of the two directions along said shaft at spaced stations therealong corresponding to the spacing of said gears and being shiftable in said one direction to release and permit follow-up movement of said clutch member and being arranged to follow-up shift movements of the clutch member in the other direction, means controllable to effect said torque relief and synchronization and to release the appropriate locking member depending on the direction of the shift, said controllable means including means automatically responsive to the shift or follow-up movement of one of said locking members for restoring said gear drive torque.

7. In a multi-speed transmission, a driving shaft, a driven shaft, a series of axially spaced gears having similar clutch teeth and providing a plurality of gear drive ratios between said shafts, one of said shafts having a set of helical splines, a toothed clutch member slidable in either direction along said splines for selective engagement with the clutch teeth of said gears, the hand of said helical splines being such that said clutch member tends to shift out of an engaged gear in a downshift direction along said shaft in response to a forward drive and in an upshift direction in response to a reversed drive, means to automatically effect a shift of said clutch member out of an engaged gear upon relief of the gear drive torque and to automatically effect a shift of said clutch member into engagement with another of said gears upon speed synchronism therewith, a locking member slidable along said shaft for co-action with said clutch member such that said locking member must be shifted in a downshift direction along said shaft through an increment corresponding to the spacing of said gears before the clutch member can follow-up said shift and the clutch member must be shifted through a corresponding increment in an upshift direction before the locking member can follow-up said shift, a normally unloaded coupling connected in parallel with said gears, means controllable to load said coupling to effect said torque relief and synchronization and to effect the shift or follow-up movements of said locking member, said controllable means including means to unload said coupling in response to the shift or follow-up movement of said locking member, and a releasable locking member adapted to prevent upshift movement of said clutch member.

8. In a multi-speed transmission, a driving shaft, a driven shaft, a series of axially spaced gears having similar clutch teeth and providing a plurality of gear drive ratios between said shafts, one of said shafts having a set of helical splines, a toothed clutch member slidable in either direction along said splines for selective engagement with the clutch teeth of said gears, the hand of said helical splines being such that said clutch member tends to shift out of an engaged gear in a downshift direction along said shaft in response to a forward drive and in an upshift direction in response to a reversed drive, means to automatically effect a shift of said clutch member out of an engaged gear upon relief of the gear drive torque and to automatically effect a shift of said clutch member into engagement with another of said gears upon speed synchronism therewith, a locking member slidable along said shaft for co-action with said clutch member such that said locking member must be shifted in a downshift direction along said shaft through an increment corresponding to the spacing of said gears before the clutch member can follow-up said shift and the clutch member must be shifted through a corresponding increment in an upshift direction before the locking member can follow-up said shift, means controllable to effect said torque relief and synchronization and to effect the shift or follow-up movements of said locking member, said controllable means including means to restore said gear drive torque in response to the shift or follow-up movement of said locking member, and a releasable locking member adapted to prevent upshift movement of said clutch member.

9. In a transmission, driving and driven members, a plurality of axially spaced gears having similar clutch teeth, each gear providing a different drive ratio between said members, a toothed clutch ring helically mounted on one of said members for screw shift movement therealong for selective engagement with said gears, said clutch ring being shiftable toward a higher gear ratio upon relative acceleration of said driven member and being shiftable toward a lower gear ratio upon relative deceleration of said driven member, a locking ring axially splined to said one member, said rings having cooperating jaws adapted to transmit drive from said driving member and being engageable at spaced stations along said one member corresponding to the spacing of said gears, a normally disengaged coupling means drivably connected between said members, shift control means selectively operable to load said coupling to effect said relative acceleration or deceleration, locking means adapted to prevent an up shift of said clutch ring and means operable to release said locking means.

10. In a transmission, driving and driven members, a series of axially spaced gears having similar clutch teeth, each gear providing a different drive ratio between said members, a toothed clutch ring helically splined to one of said members for screw shaft movement therealong for selective engagement with said gears, said toothed clutch ring being shiftable toward a higher or a lower gear ratio respectively upon relative acceleration or deceleration of said driven member, a locking ring axially splined to said one member and shiftable therealong, said rings having cooperating jaws adapted to transmit drive from said driving member, each of said jaws having opposed faces respectively parallel to said helical and axial splines, said splines and jaws being so formed that said locking and clutch rings are shiftable along their splines in a down shift or up shift direction respectively away from engagement with the other ring while said jaws prevent the other ring from following up and re-engaging the shifted ring until the jaws pass their point-to-point relationship, whereby said rings are engageable at spaced stations along said one member corresponding to the spacing of said gears, a normally disengaged coupling drivably connected between said members in parallel with said gears, shift control means operable to initiate a desired shift by loading said coupling and simultaneously elastically urging said locking ring in the direction of the desired shift, said shift control means including means responsive to the resulting shift movement of said locking ring to unload said coupling, a second locking ring axially splined to said one member and having jaws engageable with said clutch ring to prevent an up shift of said clutch ring, and means movable to shift said second locking ring to disengage its jaws.

11. In a transmission, driving and driven members, a series of axially spaced gears having clutch teeth, a toothed clutch ring helically splined to one of said members for screw shift movement therealong for selective engagement with said gears to provide a plurality of speed-ratio driving connections between said members, said ring being automatically shiftable in one direction or the other in response to relative acceleration or deceleration of said members, a normally disengaged coupling engageable to provide a drive connection between said members in parallel with said gears to effect said acceleration or deceleration, said coupling also being engageable to provide an additional speed-ratio driving connection between said members having a speed ratio higher than that available from said gears.

12. In a transmission, driving and driven members, a series of axially spaced gears having similar clutch teeth and providing a series of speed drive ratios, a toothed clutch ring helically splined to one of said members for screw shift movement therealong for selective engagement with said gears, said toothed clutch ring being automatically shiftable in one direction or the other in response to relative acceleration or deceleration of said members, a normally unloaded coupling connectable between said members, shift control means selectively operable to load said coupling to effect said relative acceleration or deceleration and operable to load said coupling to provide a direct drive between said members, a locking ring axially splined to said one member and having jaws engageable with said clutch ring to prevent shift movement of said clutch in response to overrun of the driven member, a sleeve extending from said clutch ring and surrounding said locking ring, spring means disposed between said locking ring and sleeve to bias said locking toward engagement with said clutch ring, and friction means engageable with said sleeve during said direct drive to urge said clutch ring toward engagement with the gear providing the speed drive ratio adjacent to said direct drive upon disengagement of said coupling.

13. In a multi-speed transmission, a driving member, a driven member, a plurality of gears, shiftable means having teeth selectively engageable with said gears to provide different speed-ratio driving connections between said members, and means for effecting a speed-ratio change movement of said shiftable means including a normally disengaged slip coupling engageable to reduce its slip and provide a driving connection between said members in parallel with said first-mentioned driving connections, said coupling also being engageable to provide an additional speed-ratio driving connection between said members having a speed ratio higher than that available from said gears.

14. In a multi-speed transmission, a driving member, a driven member, a plurality of gears, shiftable means having teeth selectively engageable with said gears to provide different speed-ratio driving connections between said members, means for effecting a speed-ratio change movement of said shiftable means including a normally disengaged slip coupling engageable to reduce its slip and provide a driving connection between said members in parallel with said first-mentioned driving connections, said coupling also being engageable to provide an additional speed-ratio driving connection between said members having a speed ratio higher than that available from said gears, and means operable upon interruption of said last-mentioned driving connection by disengagement of said coupling for urging shiftable means into engagement with the gear providing the next highest speed-ratio drive.

15. In a multi-speed transmission, a driving member, a driven member, a plurality of gears, shiftable means having teeth selectively engageable with said gears to provide different speed-ratio driving connections between said members, means for effecting a speed-ratio change movement of said shiftable means including a normally disengaged slip coupling engageable to reduce its slip and provide a driving connection between said members in parallel with said first-mentioned driving connections, and means automatically operative at the start of a down-shift of said shiftable means but only after completion of an up-shift to effect disengagement of said coupling, said coupling also being engageable to provide an additional speed-ratio driving connection between said members having a speed ratio higher than that available from said gears.

16. In a multi-speed transmission, a driving member, a driven member, a plurality of gears, shiftable means having teeth selectively engageable with said gears to provide a plurality of speed-ratio driving connections between said members, means automatically operative upon initiation of a speed ratio change to effect movement of said shiftable means out from engagement with one of said gears when the torque therebetween becomes substantially zero and to effect movement of said shiftable means into engagement with the selected gear upon speed synchronism therewith, means for initiating a speed-ratio change including a normally disengaged slip coupling engageable to reduce its rate of slip and provide a drive between said driving and driven members in lieu of said gears to effect said torque relief and speed synchronism, said coupling also being engageable to provide an additional speed-ratio driving connection between said members having a speed ratio higher than that available for said gears.

ROLAND CHILTON.